United States Patent
Yang et al.

(10) Patent No.: US 12,141,929 B1
(45) Date of Patent: Nov. 12, 2024

(54) AUGMENTED REALITY FURNITURE LAYOUT RECOMMENDATION

(71) Applicant: Amazon Technologies, Inc., Seattle, WA (US)

(72) Inventors: Shan Yang, Sunnyvale, CA (US); Xi Zhang, Los Gatos, CA (US); Kenan Deng, Sunnyvale, CA (US); Junbang Liang, San Jose, CA (US); Tomas F. Yago Vicente, Caspe (ES); Ramesh Krishnamurthy, Dublin, CA (US); Esra Gokcen Boduroglu, Seattle, WA (US); Yu Lou, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 174 days.

(21) Appl. No.: 18/082,213

(22) Filed: Dec. 15, 2022

(51) Int. Cl.
   *G06T 19/00*   (2011.01)
   *G06T 19/20*   (2011.01)

(52) U.S. Cl.
   CPC ............ *G06T 19/006* (2013.01); *G06T 19/20* (2013.01); *G06T 2219/2004* (2013.01)

(58) Field of Classification Search
   CPC G06T 19/006; G06T 19/20; G06T 2219/2004
   See application file for complete search history.

(56) References Cited

U.S. PATENT DOCUMENTS

| | | | |
|---|---|---|---|
| 2014/0267717 A1* | 9/2014 | Pitzer | G01C 15/002 |
| | | | 703/1 |
| 2021/0133850 A1* | 5/2021 | Ayush | G06V 10/945 |
| 2021/0248669 A1* | 8/2021 | Wade | G06F 3/016 |
| 2022/0157035 A1* | 5/2022 | Delgado | G06T 19/003 |

* cited by examiner

*Primary Examiner* — Jeffery A Brier
(74) *Attorney, Agent, or Firm* — K&L Gates LLP

(57) ABSTRACT

Devices and techniques are described for augmented reality furniture layout recommendation. In some examples, first data comprising a three dimensional (3D) model of a room is received. Second data representing an intended usage of the room may be received. A first machine learning model may generate a first collection template using the first data and the second data. The first collection template may include first bounding box data representing a first category of furniture and second bounding box data representing a second category of furniture. The first bounding box data representing a first bounding box having a first size and located at a first position within the 3D model at a first orientation. The second bounding box data representing a second bounding box having a second size and located at a second position within the 3D model at a second orientation.

20 Claims, 13 Drawing Sheets

AUGMENTED REALITY FURNITURE LAYOUT RECOMMENDATION

BACKGROUND

Augmented and mixed reality systems combine the real, physical world with virtual objects displayed in a display that depicts both real-word objects in the physical environment and graphical representations of virtual objects as though the virtual objects are part of the physical environment. Virtual information can be constructive, in which the virtual objects add to the physical environment (e.g., adding text describing nutritional information to a plate of food) or destructive, in which the virtual objects mask some part of the physical environment. Augmented reality alters an ongoing perception of the real world and, as such, is considered to be an immersive aspect of the physical environment.

DETAILED DESCRIPTION

Figure 1A:
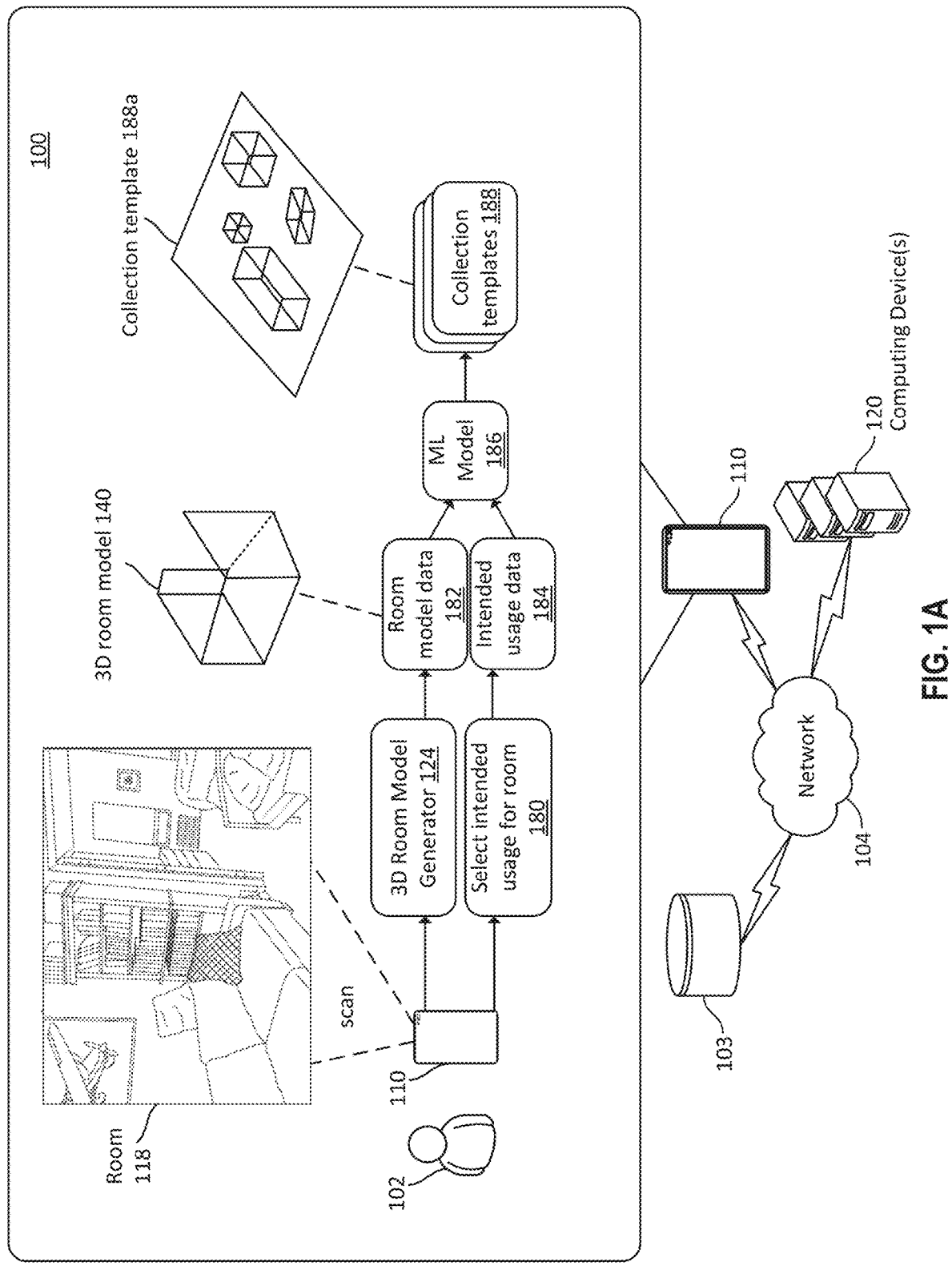
FIG. 1A depicts an example augmented reality furniture layout recommendation system in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Augmented reality interfaces display portions of the physical environment (e.g., the "real world") together with virtual objects (e.g., graphics, text, etc.) such that reality is augmented with the virtual objects. In augmented reality interfaces, virtual objects may be displayed in an opaque fashion such that they overlay and replace portions of the physical world. This may be desired in some instances. For example, an augmented reality skin may be used to change the print on a person's shirt to a different print. Accordingly, the desired print may be a virtual skin that is displayed overlaying the real-world print on a given person's shirt so that the virtual print, in effect, replaces the real-world print on the augmented reality display. Augmented reality typically refers to interfaces in which virtual and real world objects are displayed together on a display and in which the real world objects were captured using one or more cameras prior to rendering the real world objects on the display. Mixed reality, on the other hand, typically refers to interfaces including a display that is at least partially transparent. In mixed reality interfaces the user is able to directly perceive real world objects through the transparent display (as when a user wears glasses), while virtual objects may be rendered on the display and may, in some cases, occlude real world objects. Although augmented reality is typically referred to herein, the systems and techniques described herein may be equally applicable to augmented and mixed reality systems and interfaces. Accordingly, the term "augmented reality" is hereinafter used to refer to augmented reality systems and interfaces or mixed reality systems and interfaces, or in some cases, combinations of the two systems/interfaces.

In various examples, a user may select a virtual item (e.g., from an online catalog and/or via an application) and may view the virtual item in an augmented reality interface such that the virtual item appears to be placed with the user's physical environment. For example, the user may select a virtual piece of furniture and may display the virtual furniture via an augmented reality interface on the user's mobile device overlaid on top of a camera view of the physical environment. This may allow the user to see what the piece of furniture would look like if it were placed in the user's room.

However, existing augmented reality interfaces used in such contexts merely enable the user to place selected virtual items within any desired physical space and typically do not account for the particular room or other physical space including the floor plan of the space, the various textures and/or colors, and/or a furniture collection layout that includes more than simply a single selected virtual item.

Described herein are various systems and techniques that may be used to generate a 3D model of a user's environment. In addition, the various systems and techniques receive a user input indicating an intended usage of the physical space (e.g., a way in which the user intends to use the room or other physical environment). Using the 3D room model and the intended usage data, a machine learning model generates various recommended furniture layouts which include 3D location and 3D sizes of various categories of furniture for the room. The recommended furniture layouts may be referred to herein as "collection templates" and may be populated using virtual items (e.g., virtual representations of real world furniture items) selected from an online database or databases. Accordingly, prior to populating bounding boxes of a given collection template with virtual items, the bounding boxes may be referred to as "unpopulated," as the bounding boxes are associated with particular furniture categories, sizes, positions, and orientations, but not with specific items. Once populated collection templates are generated, the populated collection templates may be rendered and displayed to the user. The user can optionally select one or more of the populated collection templates and an augmented reality representation of the populated collection template may be generated and displayed such that the furniture items of the populated collection template appear overlaid on a camera view of the user's physical environment (such that the virtual furniture items, arranged according to the predicted collection template appear to be within the physical environment on the augmented reality display).

In various examples described herein, the populated collection templates may be ranked prior to outputting the populated collection templates to the user (e.g., on a user interface). As described in further detail below, the populated collection templates may be ranked based on conformance of the dimensions of furniture items to the respective 3D bounding boxes associated with those furniture items within the collection template. Additionally, as described in further detail below, the populated collection templates may be further ranked based on a comparison of a number of furniture items associated with a given intended usage of a room and the predicted number of furniture items for the room in the collection template. In various examples, weighted combination of these metrics may be used to generate a score for each populated collection template. The populated collection templates may then be ranked based on the scores.

Depth data may be available from depth sensors of mobile devices. For example, Lidar sensors, time-of-flight sensors, stereoscopic camera sensors, etc., may be used to provide depth data comprising sets of three dimensional (3D) coordinates describing surfaces and points on objects detected in the physical environment. The depth data may be used in conjunction with various techniques described herein to determine a location of physical objects (such as walls, floors, windows, doors, fireplaces, staircases, etc.) in the augmented reality space. As described in further detail below, a 3D room model may be constructed for the room and data representing the 3D room model may be input into a transformer-based machine learning model (or other machine learning model architecture) that may generate one or more recommended collection templates as described herein.

Machine learning techniques, such as those described herein, are often used to form predictions, solve problems, recognize objects in image data for classification, etc. For example, as described herein, given a 3D room model and an intended usage of a room, a machine learning model may recommend a furniture layout for the room, including specific positions, sizes, and orientations for particular categories of furniture (or other items). In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1A depicts an example augmented reality furniture layout recommendation system 100 in accordance with various aspects of the present disclosure. Computing device (s) 120 may include non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, non-transitory computer-readable memory 103 may store instructions that may be used to implement the augmented reality interface and/or the dynamic occlusion techniques described herein.

A mobile device 110 (e.g., a smart phone, tablet device, wearable device (e.g., including AR glasses, etc.) and/or any other mobile device including a camera and at least one processor) may include a light detection and ranging (Lidar) sensor, in addition to an image sensor configured to generate frames of RGB image data. A mobile application may execute on the mobile device 110. The mobile application may provide an augmented reality interface that is effective to display a real-world environment along with integrated virtual objects. The mobile application may employ the camera and the Lidar sensor of the mobile device and may provide a visualization of the user (using a live view of the camera feed). The visualization may guide the user through scanning a room (e.g., room 118) or other physical environment in order to generate room model data 182 representing a 3D model of the environment in the augmented reality space using 3D room model generator 124 (e.g., an application executing on mobile device 110 and/or on remote computing device(s) 120). The particular visualizations of the mobile application and/or scanning guidance may vary from implementation to implementation.

Figure 2A:
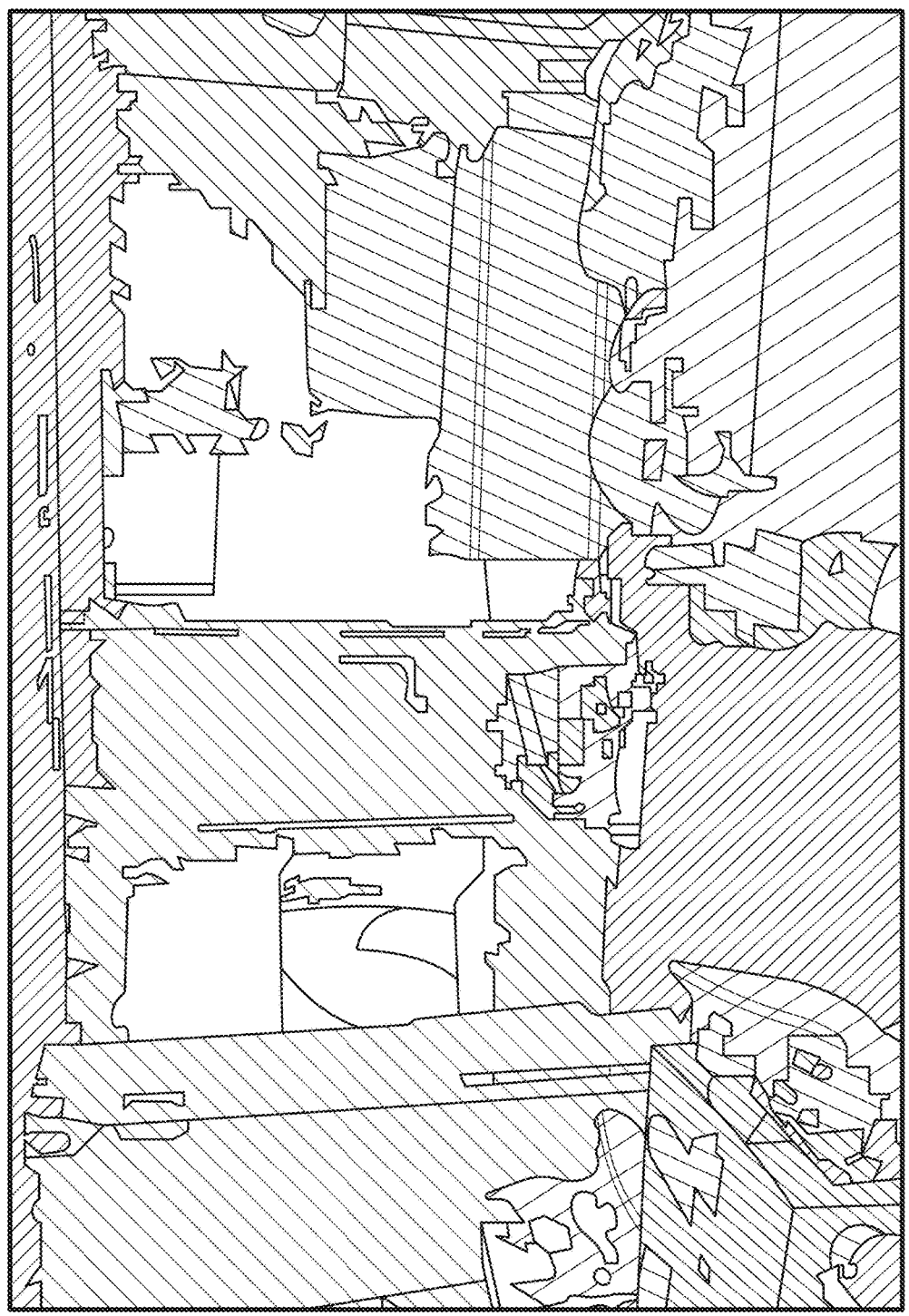
FIG. 2A depicts a representation of depth data that may be generated by a depth sensor and that may be used to generate 3D room model data, in accordance with various techniques described herein.

Depending on the particular mobile device 110, a camera and/or a depth sensor (e.g., a Lidar sensor) may generate depth map data. The depth map data may include distance information representing the distance between the camera (and/or other depth sensor) to the various surfaces of objects/structures in an image captured by the camera and/or depth sensor. For example, the depth map may be a frame of image data wherein each pixel is associated with a Z-value representing a distance between the surface represented by that pixel and the camera/depth sensor. Accordingly, in at least some examples, a depth map may be a frame of image data in which each pixel (or each pixel for which there is depth information) comprises R, G, B, and Z values. An example of a depth map image frame (e.g., depth data 150) is shown in FIG. 2A.

In some examples, the depth map data may be used to generate a point cloud (e.g., point cloud data), wherein each point in the point cloud includes 3D coordinates for that point (e.g., (X, Y, Z)). Depth map data (which may include depth values for each pixel) may be transformed into point cloud data using "unprojection" techniques. Typically, unprojection uses camera intrinsics (e.g., field-of-view information (e.g., in degrees), sensor size information (e.g., in millimeters) and camera extrinsics (e.g., position and rotation of the camera in 3D space) to determine 3D coordinates for the image pixels. The 3D points in the point cloud represent positions of objects/surfaces detected by the camera/depth sensor of mobile device 110. In some examples, the point cloud data may be converted into a mesh, however, in other examples, the points of the point cloud may be directly used by 3D room model generator 124 to generate room model data 182, as described in further detail below.

Figure 2B:
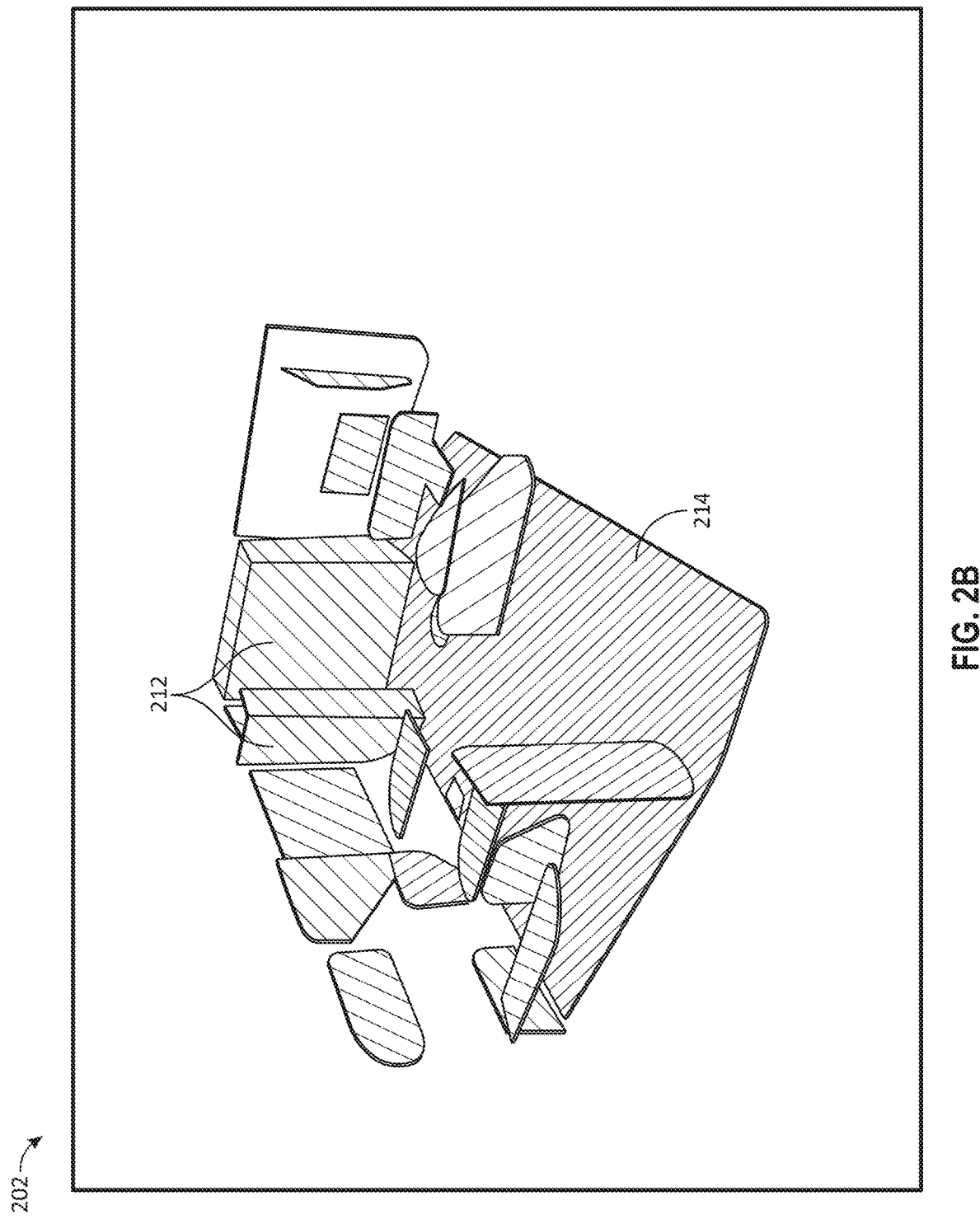
FIG. 2B depicts an example of plane data that may be used to generate the 3D room models described herein, in accordance with various examples described herein.

In some examples, the point cloud data may be filtered to distinguish between points corresponding to structural elements of the physical environment (e.g., walls, floors, ceilings, etc.) and points corresponding to non-structural objects (e.g., furniture) in order to generate the room model data 182. For example, plane data may be generated by the mobile device 110 (e.g., by an image processing component of the mobile device 110). For example, mobile device 110 may detect and classify various pixels in an input image as belonging to one or more planes (e.g., polygons) in the physical environment. The plane data generated by mobile device 110 may (e.g., plane data 202 depicted in FIG. 2B) may classify the location of such planes in the physical environment (e.g., using a machine learning classifier such as a convolutional neural network based classifier, a feed forward network, a visual transformer-based classifier, or similar). Additionally, the plane data generated by mobile device 110 may classify the different planes as structural elements (e.g., wall, floor, ceiling, etc.). For example, in FIG. 2B, there may be wall planes 212, floor plane 214, etc.

The plane data 202 and/or the depth data 150 may be used to generate the room model data 182 which may include a top-down floor plan of the room (e.g., coordinates describing the size and shape of the floor plane), wall data describing the location, size, and shape of walls of the room, ceiling data describing the location, size, and shape of the ceiling of the room, door data describing the location, size, and shape of doors of the room (e.g., including their position along a particular wall), windows of the room, fireplaces, and/or other fixtures.

Figure 1B:
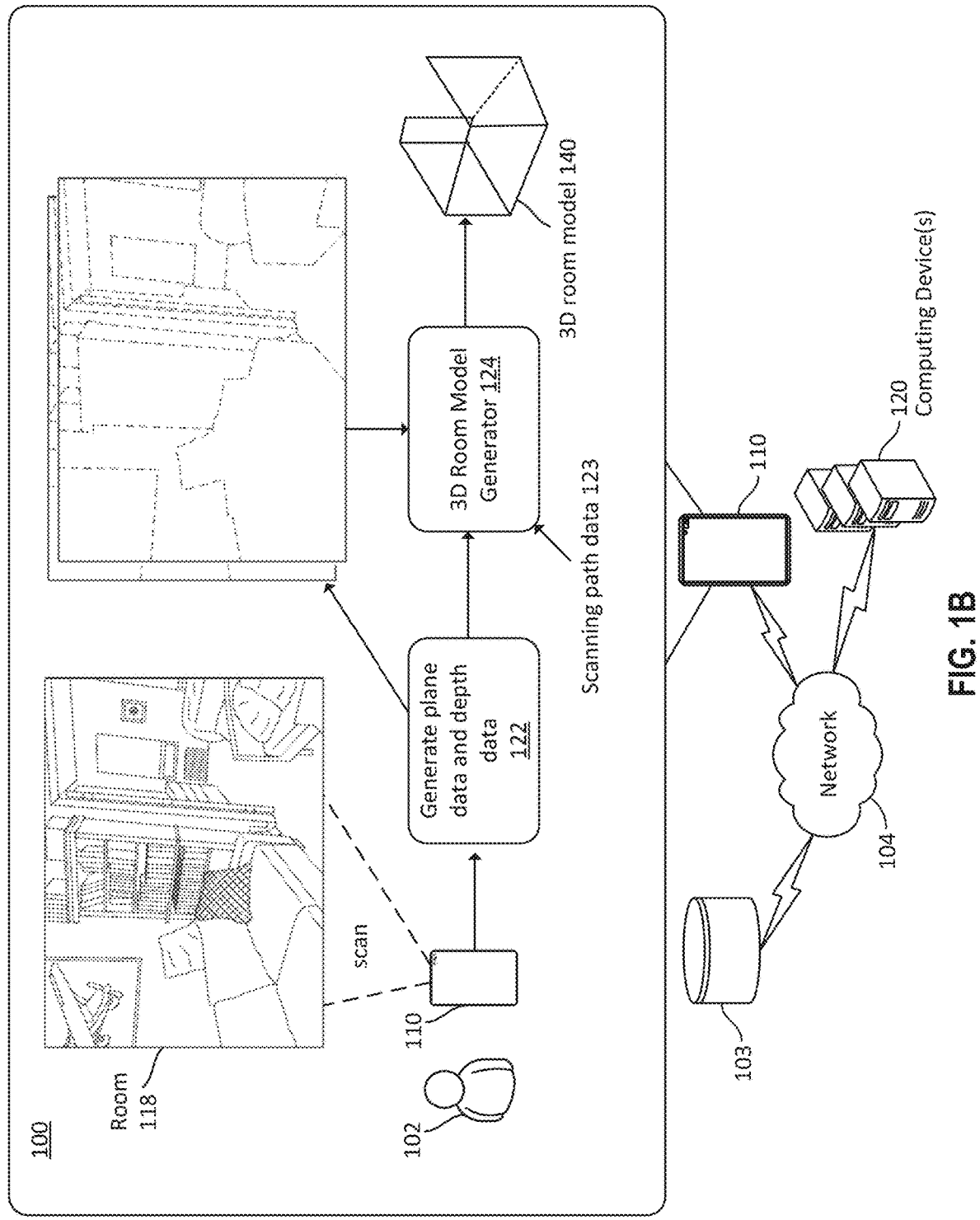
FIG. 1B depicts an example of three dimensional (3D) room model generation in accordance with various aspects of the present disclosure.

FIG. 1B depicts an example of three dimensional (3D) room model generation in accordance with various aspects of the present disclosure. The mobile device 110 may generate plane data and depth data 122. In various examples, a mobile device 110 including a depth sensor may include a chip set that may be effective to generate plane data (e.g., plane data 202 depicted in FIG. 2B) and/or depth data (e.g., depth data 150 depicted in FIG. 2A). In some examples, 3D mesh data of objects and/or surfaces in the room may be generated by the mobile device 110. The plane data and depth data 122 may be input into the 3D room model generator 124. In various examples, scanning path data 123 representing a path of the mobile device 110 during the scanning operation of the room 118 may also be input into the 3D room model generator 124.

In various examples, the 3D room model generator 124 may use supervised machine learning approaches to detect the various structural elements of a room (including the walls, windows, doors, and/or other fixtures) based on annotated example images, plane data, depth maps, and/or 3D segmentation masks to generate the 3D room model 140 (and/or the room model data 182). The 3D room model 140 may be represented as room model data 182. The 3D room model generator 124 may use any of the aforementioned techniques to generate the 3D room model 140 and the room model data 182.

Computing device(s) 120, mobile device 110, and/or some combination of these devices may implement the augmented reality furniture layout recommendation system 100. In various examples, user 102 may be prompted on a user interface of mobile device 110 to select an intended usage for the room 118 (block 180). The user may select from a predefined list of intended room usages. Some examples of intended room usage may include living room, television-watching room, dining room, bedroom, reading room, game room, den, kitchen, pantry, garage, craft room, etc. This list is non-exhaustive and meant merely to provide illustrative examples. The selected intended usage may be represented as intended usage data 184. The intended usage data 184 and the room model data 182 may be input into the machine learning model 186. The machine learning model 186 may be implemented as, for example, a transformer based model and may be trained as described in further detail below.

The machine learning model 186 may generate one or more collection templates 188. The intended usage data 184 may be mapped to pre-defined sets of required and optional furniture categories, as described in further detail below. In various examples, a given collection template 188 may include 3D bounding boxes positioned within the 3D room model 140, where each 3D bounding box is associated with a category of furniture (e.g., furniture category data). The machine learning model 186 may be trained such that categories of furniture that are in the set of required furniture categories for the input intended usage are represented in the collection template 188. In addition, the machine learning model 186 may predict any number of categories of furniture in the optional furniture category set for the intended usage. The machine learning model 186 is trained using designed furniture collections for different rooms.

An example training instance for the machine learning model 186 may include a 3D room model of a room, labeled instances of furniture items in the room, including labels for the furniture item's category c, size s (e.g., length, width, and height of a bounding box for the furniture item), position p (x, y, z coordinate location within the input 3D room model), and orientation o (e.g., rotation around a vertical axis (e.g., the Z-axis) of the 3D room model). The 3D model of the room in the training instance may include room floor plan data/which may be a top-down centered binary room floor plan image, a set of room window data W including window size s (e.g., Ws), window position p (e.g., Wp), and window orientation o (e.g., Wo), and a set of room door data D including door size s (e.g., Ds), door position p (e.g., Dp), and door orientation o (e.g., Do). Optionally, fireplace or other fixture data may also be included. Additionally, labeled color and/or texture data may be included and associated with various surfaces represented by the training instance. In some examples, depth map data and/or plane data may also be included in the training instances.

The machine learning model 186 may be trained, as described below, using such training instances to generate collection templates 188. A collection template includes a collection of 3D bounding boxes, each such 3D bounding box having a furniture category c (e.g., a scalar representing the category of the piece of furniture for that bounding box), a size s, a position p, and an orientation o, as described above. The bounding boxes of a collection template 188 are not yet associated with specific furniture items and can be populated with different furniture items according to the sizes and categories of the 3D bounding boxes. For example, a 3D bounding box having a category c=chair may be populated with any number of virtual chair items that have dimensions that are equivalent to the size s of the 3D bounding box in the collection template 188. For example, if the cubed size of the virtual furniture item (e.g., l×w×h) is within 10% (or some other desired tolerance) of the cubic size of the 3D bounding box the virtual furniture item may be selected (provided that it is of the same category c). In some examples, virtual furniture items may be selected based on available color, texture, and/or style options to conform to an overall look of the room. The transformer-based machine learning model 186 may learn such complimentary features and may recommend virtual items that are visually complementary.

Accordingly, the collection templates 188 may represent different predicted furniture layouts for a user-scanned room including furniture types (categories), orientations, positions, and sizes. However, as the collection templates 188 are not yet populated no specific furniture items are selected. In various examples, visualizations of collection templates 188 may be displayed to a user (e.g., either with bounding box representations or with representative sample items displayed) so that the user can select between different furniture layouts of interest. In other examples, the collection templates 188 (including example collection template 188*a*) may be populated with virtual items according to the categories c and sizes s of the 3D bounding boxes (as well as the visual complementariness of the virtual items) and rendered on the display of the mobile device 110 so that the user may select between populated collection templates. In some examples, post-processing may occur prior to rendering the collection templates. For example, an optimization problem may be solved (as described in further detail below) that constrains the position of the 3D bounding boxes within the 3D room model 140 such that the 3D bounding boxes do not overlap and do not cross room boundaries (e.g., walls, floors, etc.). For example, overlapping 3D bounding boxes may be repositioned such that they are spaced apart from one another in a spaced relationship and do not overlap with other 3D bounding boxes and/or with any other boundaries (e.g., walls, floors, ceilings).

As used herein, T={(c, s, p, o)} refers to a collection template 188 (e.g., a collection of 3D furniture bounding boxes with (c, s, p, o) information. C={furniture_item} refers to a collection of virtual furniture items (which may correspond to real furniture items) that may be placed in a collection template in order to populate the collection template. Cp={(furniture_item, c, s, p, o)} refers to a populated collection template (e.g., a collection of virtual furniture items with (c, s, p, o) information with respect to the 3D room model 140).

Figure 1C:
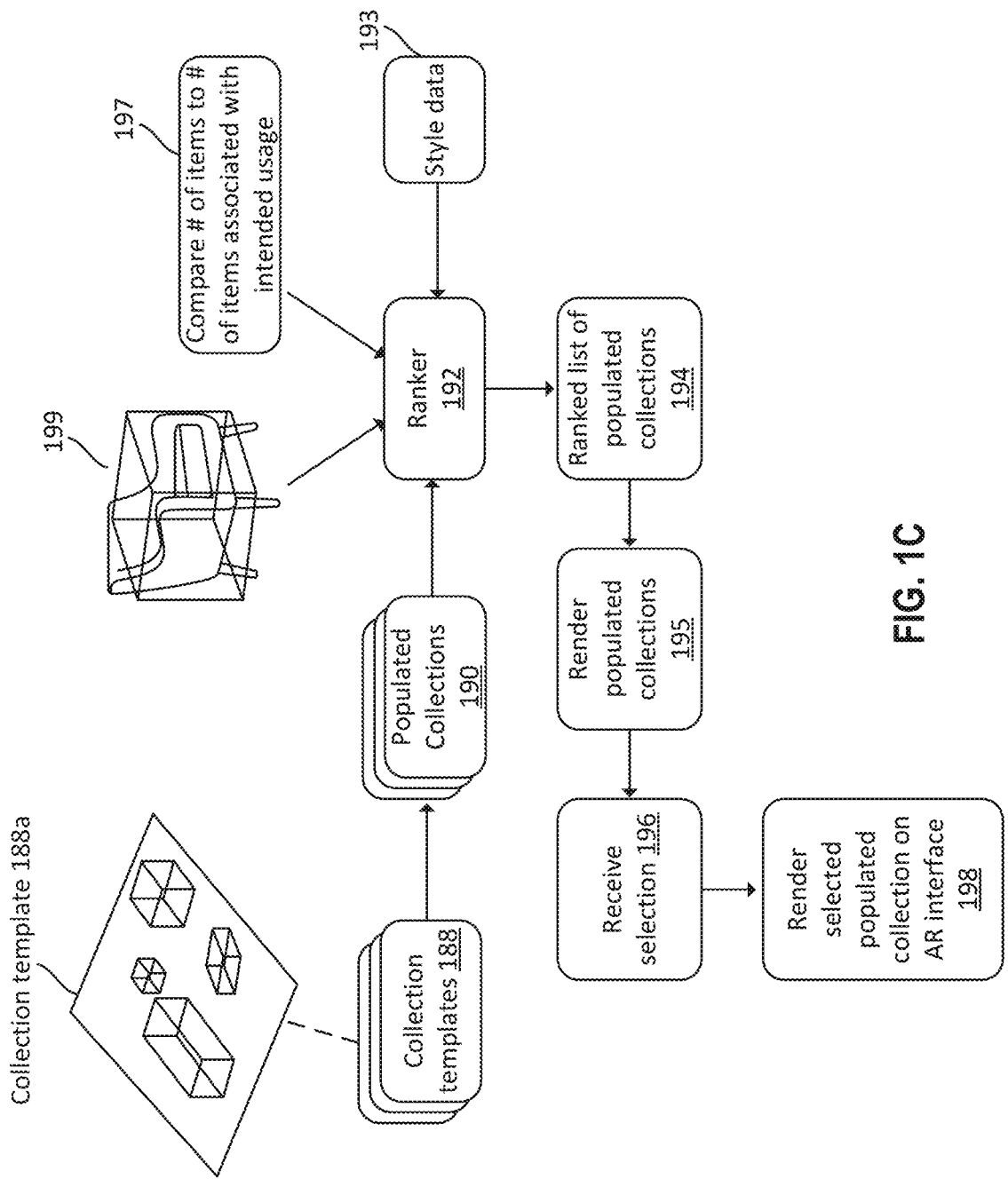
FIG. 1C depicts an example of populated collection template ranking and output via an augmented reality interface, in accordance with various aspects of the present disclosure.

FIG. 1C depicts an example of populated collection template ranking and output via an augmented reality interface, in accordance with various aspects of the present disclosure. In various examples, furniture items may be mapped to a collection template 188 (e.g., collection template 188*a*). In various examples, a machine learning model (not shown in FIG. 1C) may be used to determine the various furniture items used to populate a given collection template 188. The machine learning model may take in a lifestyle image (e.g., an image of a room designed by a design expert) as a style seed along with the pre-set intended usage data 184 (selected by the user 102). The machine learning model may be trained to output a set of furniture items that are stylistically compatible with the input image. During runtime, the input images may be images of the user's room 118 so that furniture that is stylistically compatible with the colors and/or textures of the room may be determined and used to populate the collection templates 188.

A populated collection 190 refers to a collection template where each 3D bounding box of the collection template 188 has been populated with a particular furniture item (e.g., a virtual furniture item) having the same category as the 3D bounding box. At least one populated collection 190 may be generated for each collection template 188, although multiple populated collections 190 may be generated for each collection template 188, depending on the desired implementation. As there may be a large number of populated collections 190, a ranker 192 may be used to decide which populated collections 190 to display to the user (and/or the order in which the populated collections 190 should be displayed).

Ranker 192 may determine a score for each populated collection 190. In an example, the score may be computed using at least two inputs. The first input may represent a conformance 199 (e.g., a degree of conformance or non-conformance) of a size of a furniture item with respect to the 3D bounding box associated with that furniture item in the collection template 188. For example, a chair in a populated collection 190 may have a width of 1.2 m. The 3D bounding box for that chair (and having the category c=chair) may have a width of 1.0 m. Accordingly, there may be a difference value of −0.2 m (e.g., 1.0 m-1.2 m) indicating that the width of the virtual furniture item exceeds the 3D bounding box along the width dimension by 0.2 m. This difference value may be determined along each dimension to determine a cubic difference value (e.g., in $m^3$). This degree of conformance may be computed for each populated 3D bounding box in the populated collection 190 and a total degree of conformance 199 may be input, for the current populated collection 190, to ranker 192.

The other input to the ranker 192 may compare the number of items associated with the predefined intended usage of the room with the number of items in the populated collection 190 (e.g., the number of 3D bounding boxes in the collection template 188). This input is represented by input score 197 in FIG. 1C. Since the machine learning model 186 does not predict a set number of furniture items, the number of 3D bounding boxes may be variable among the collection templates 188. In an example, for the intended usage type=television-watching room, there may be 15 items associated with rooms of that functional usage type. The maximum score for the input score 197 may be 15, for example, or some multiple of 15. However, the current populated collection 190 being evaluated may have only 12 3D bounding boxes. The input score 197 may be reduced for each missing item. In the current example, the score may be reduced by three for the three missing items (e.g., 15−12=3) and the score may be +12.

The ranker 192 may combine the input score 197 and the total degree of conformance 199. In an example, these two inputs may be weighted by ranker 192. For example, the ranker 192 may multiply the input score 197 by 0.8 and the total degree of conformance 199 by 0.2 and generate a weighted sum. For example, 12*0.8+−7.2*0.2=8.66 (where −7.2 represents the total degree of conformance for the populated collection 190 and 12 represents the input score 197). In this example, higher scores lead to higher-ranked populated collections 190, however, alternate implementations where lower scores lead to higher-ranked populated collections 190 may instead be used, as desired. Additionally, the weighting values may be tuned according to the desired implementation (e.g., 0.8 and 0.2 are merely examples). A score may be generated for each populated collection 190 to generate a ranked list of populated collections 194.

In some examples, style data 193 related to each populated collection 190 may optionally be used in addition to, or instead of, one or more of the input score 197 and the total degree of conformance 199 by ranker 192 to generate the ranked list of populated collections 194. For example, each populated collection 190 may be associated with a particular decorating style. For example, a machine learning model used to select the visually-complementary virtual furniture items that are used to populate the bounding boxes of the collection templates 188 to generate the populated collections 190 may be trained to also output a style tag for each populated collection. For example, during training, the machine learning model used to populate the collection templates may be trained using training data instances with style labels and may thus predict style labels for the output populated collections 190 during inference. In some examples, a user may apply a filter indicating that the user prefers a particular style or styles. Examples of styles may include, traditional, mid-century modern, contemporary, classical, etc. In some examples, populated collections 190 that do not have a metadata tag corresponding to the selected style may be filtered out. In other examples, the selected style may be embedded by an encoder of the ranker 192. In such examples, the style embedding may be used together with the input score 197 and the total degree of conformance 199 to predict the ranked list of populated collections 194.

The ranked list of populated collections 194 (where each populated collection comprises Cp={(furniture_item, c, s, p, o)}) may be rendered (block 195). In various examples, to conserve compute resources, only the top ranked populated collections 194 (e.g., the top 3, 10, 20, etc.) may be rendered in order to reduce latency and/or compute requirements. The rendered, top-ranked populated collections may be displayed on the mobile device 110. A user may select one of the ranked, rendered populated collections (according to their preference) to enable an augmented reality experience. Accordingly, at block 196, a selection of one of the rendered populated collections may be received. The selected populated collection may be rendered in 3D based on the 3D room model 140 on an augmented reality interface (block 198). For example, a live camera view of the user's room 118 may be shown, but the furniture items form the selected populated collection may be rendered according to their positions (c, s, p, o) within the 3D room model 140, which corresponds to the physical room 118. Accordingly, the user can view the entire furniture collection in the user's room 118.

Figure 3A:
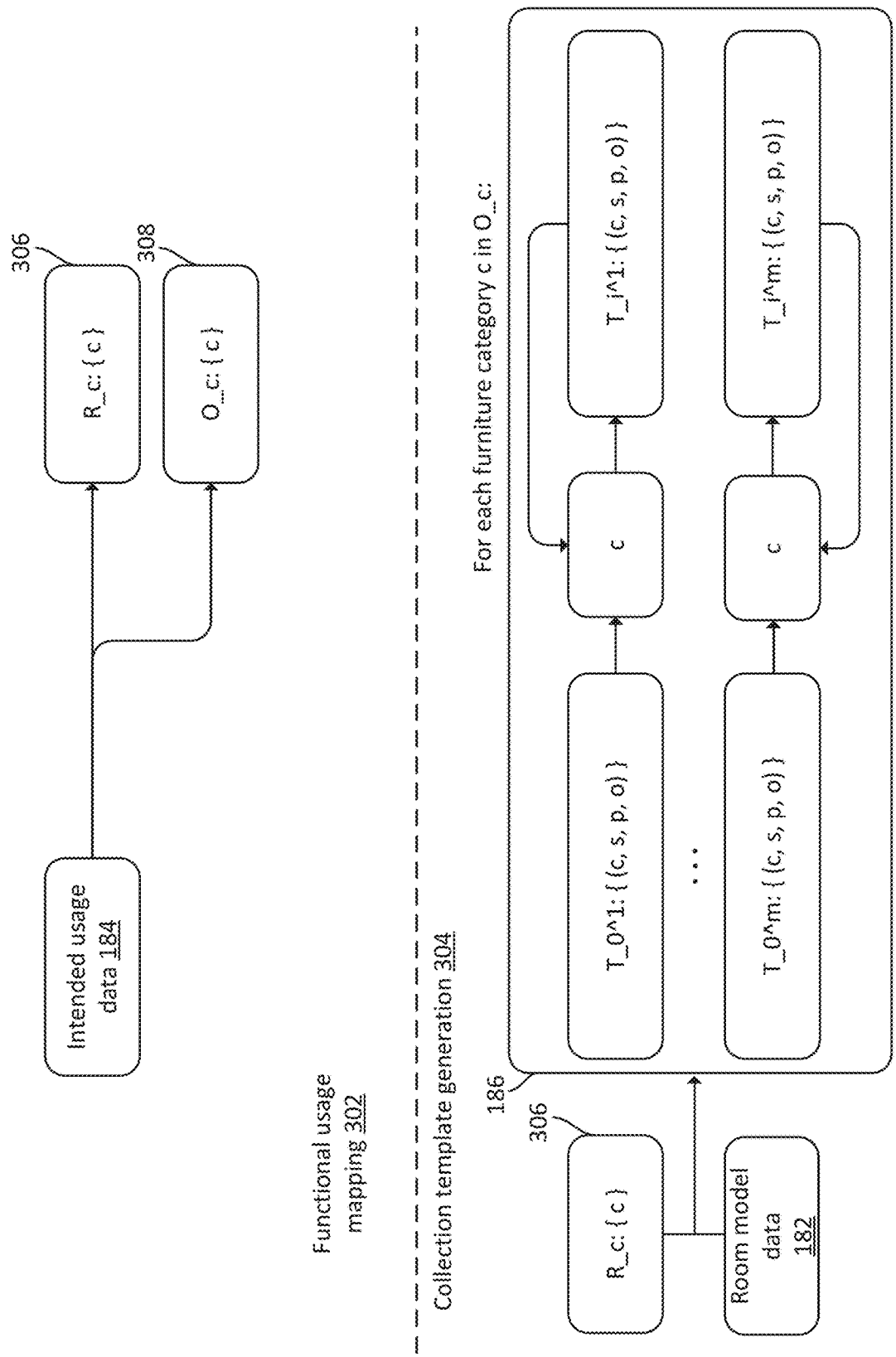
FIG. 3A depicts an example of functional usage mapping and training of a machine learning model used to generate collection templates, in accordance with various aspects of the present disclosure.

FIG. 3A depicts an example of functional usage mapping and training of a machine learning model used to generate collection templates, in accordance with various aspects of the present disclosure. Functional usage mapping 302 refers to mapping each distinct intended usage of a room or other physical space to required furniture categories 306 (R_c: {c}) and optional furniture categories 308 (O_c: {c}). For example, for a room with the intended usage data 184 "television watching room", the required furniture categories 306 may include {couch; television; media stand; . . . }. Optional furniture categories may include furniture, but also decorative items (e.g., vases, house plants, art, etc.) and may be ranked using an importance score and/or ordered based on importance. For the room with the intended usage data 184 "television watching room", an optional furniture categories 308 may include {floor lamp; end table; table lamp; . . . }. In another example, for a room with the intended usage data 184 "bedroom", the required furniture categories 306 may include {bed; side table; . . . } and the optional furniture categories 308 may include {table lamp; rug; hanging decoration; . . . }.

Collection template generation 304 may refer to the training stage of the machine learning model 186. For a given 3D room model (e.g., room model data 182), an intended usage may be selected and intended usage data 184 may be generated. As described above, the functional usage mapping 302 may map the intended usage data 184 to the set of required furniture categories 306.

During training, the machine learning model 186 may be trained on a large number (e.g., tens of thousands, etc.) of interior designer designed rooms. The interior designer designed rooms are pre-processed into a black and white floor plane image (e.g., floor plan data F), the room window data W, the room door data D (and optionally other fixture data, such as fireplaces).

The furniture items in the training instance and the room features (window, door and fireplace) are represented as 3D bounding boxes with 3D position p, category c, size s, and rotation angle (e.g., orientation o) around the up axis (e.g., the z-axis). In the case that the machine learning model 186 is a transformer-based model, the room features and/or furniture items may be considered as tokens. The machine learning model 186 takes in the floor plan image, a set of room feature tokens and a set of randomly shuffled and randomly cut furniture item tokens and the model needs to predict the next furniture item category in the original pre-cut sequence. For example, for a first training instance having 5 furniture items, the furniture items may be randomly shuffled (e.g., in terms of the order) and "chopped" such that the first and second furniture items are provided to the model as input and the model is tasked with predicted the third furniture item based on the first and the second. Then the model is tasked with predicting the fourth furniture item based on the first, second, and predicted third, and so on. However, for a second training instance having 10 furniture items, the furniture items may be randomly shuffled and chopped at a different position in the set. For example, the first, second, third, and fourth furniture items may be provided to the machine learning model 186 and the model may be tasked with predicting the position p, category c, size s, and orientation o of the next item, and so on. The machine learning model 186 learns a statistical model for the position, size, rotation angle, and next category based on the training.

Figure 3B:
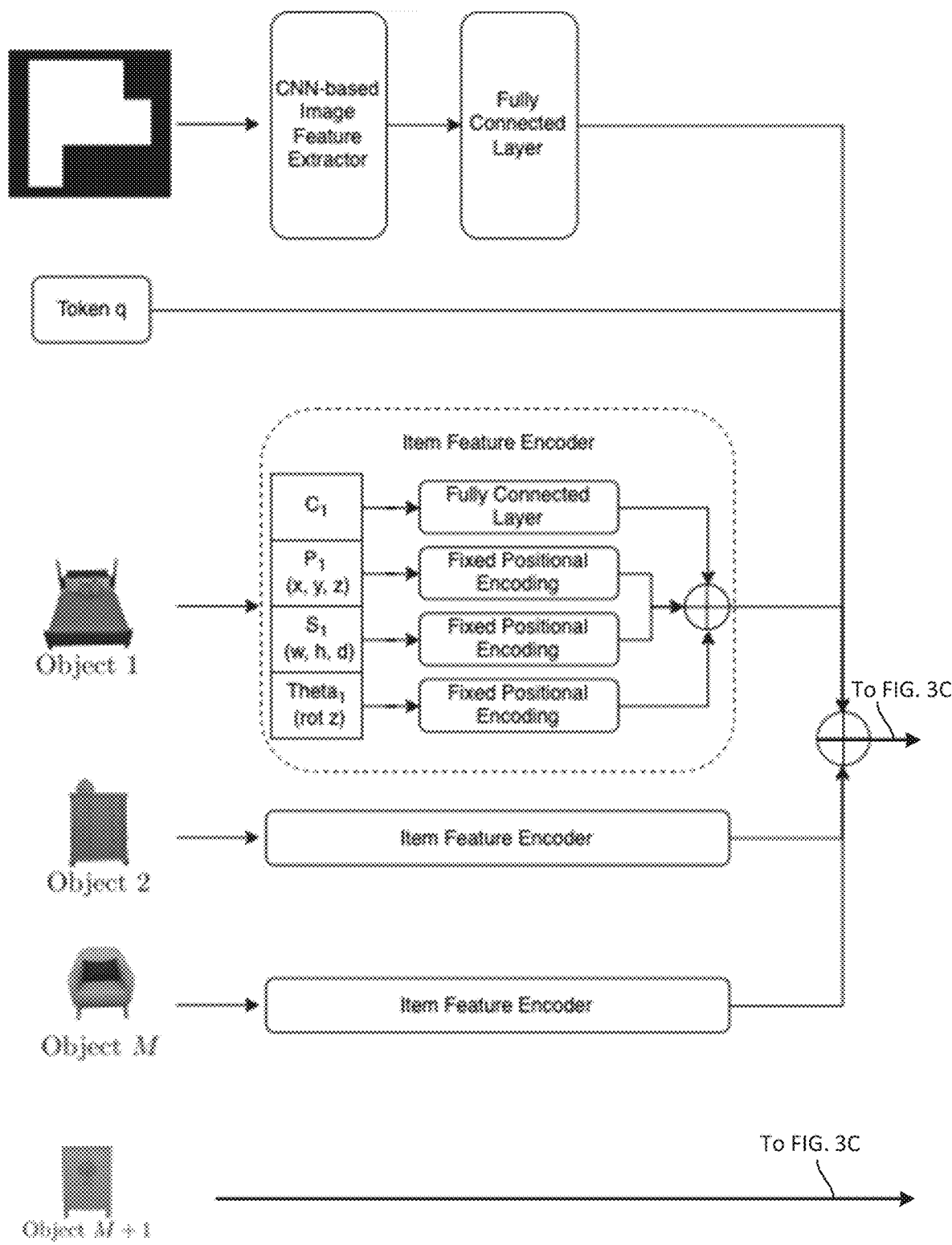
FIGS. 3B and 3C depicts an example of machine learning model that may be used to generate collection templates, in accordance with various aspects of the present disclosure.
Figure 3C:
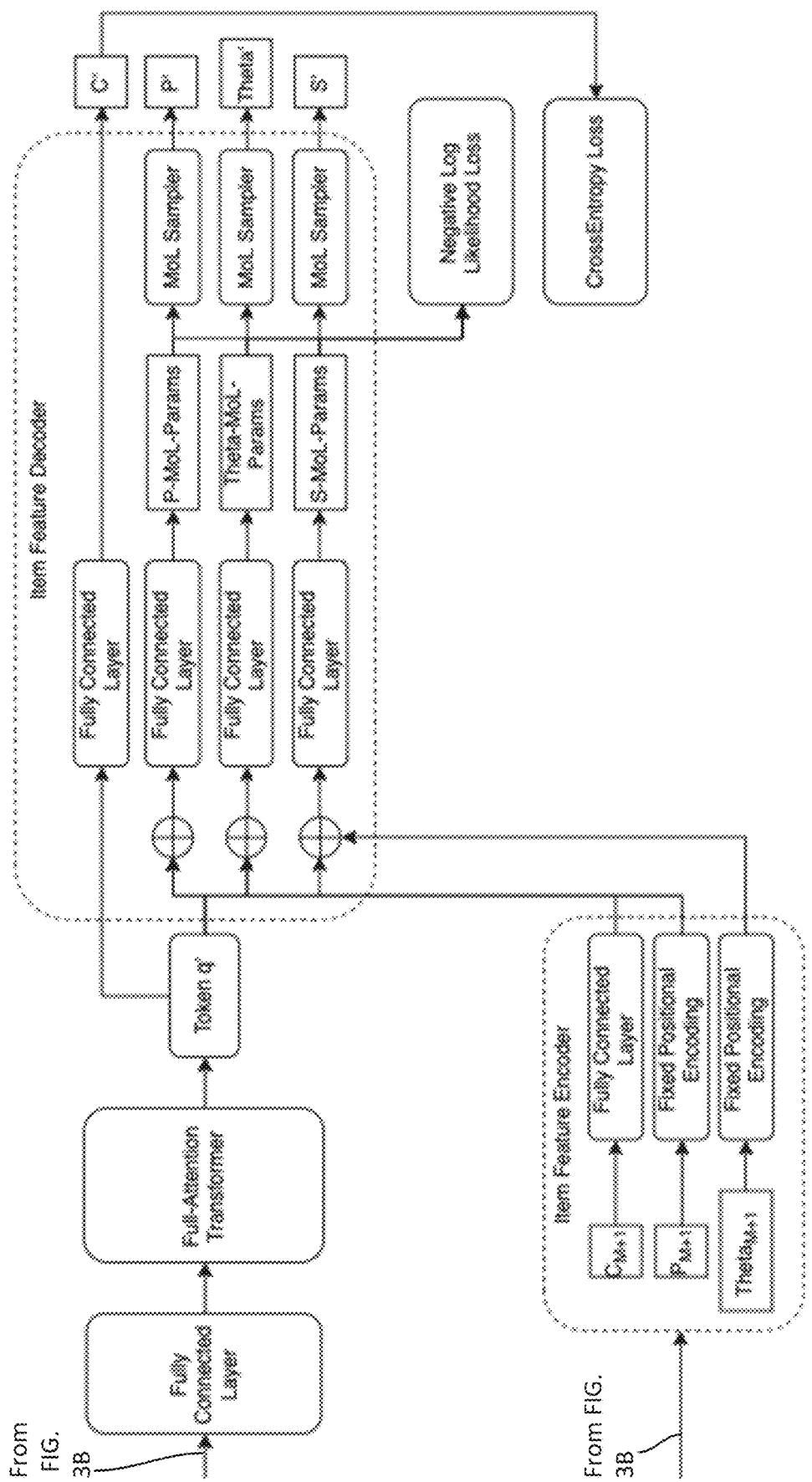

FIGS. 3B and 3C depict an example architecture of the machine learning model 186 in accordance with various implementations. As shown in FIG. 3B, a CNN-based image feature extractor may be used to generate feature data representing the input 3D room model (e.g., the floor plan image). The output of the machine learning model 186 (e.g., the transformer model) may be chained together. For example, the output of the full-attention transformer (token q' in FIG. 3C) is used to predict the item category c' (for the first bounding box). Next, the category embedding together with the output of the transformer predicts the position p'. Then the position embedding together with the category embedding and the transformer output embedding is used to predict the rotation theta'. Then, the category, position, rotation, and transformer output embedding are used to predict the size s'.

Transformer models (e.g., transformer machine learning models such as the example depicted in FIGS. 3B and 3C) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer may instead receive a set of images of objects as input. In various examples, the images may represent items that are arranged together in an environment. For example, a room with one or more furniture items (including the size, orientation, position, and category) and/or other characteristics (e.g., floor type, wall paint color, wallpaper patterns, with different artwork, etc.) may be decomposed into individual images of each item and/or a subset of the items in the room. In some examples, the set or subset of items in the room may be detected using an object detector. A backbone network (e.g., a convolutional neural network) may be used to generate feature embeddings representing the individual item images and the scene images including all of the items arranged together. These embeddings may be input into a transformer encoder along with positional embeddings describing a spatial position of each of the items within the room (e.g., within the frame of image data). As described in further detail below, the transformer may generate output embeddings comprising visual representations of items that are visually complementary to the room and the input items.

In general, the encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $d_{ij}$ from token is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $d_{ij}$, the attention from i to each token.

The attention calculation for all tokens can be expressed as one large matrix calculation, which is useful for training due to computational matrix operation optimizations which make matrix operations fast to compute. The matrices Q, K, and I' are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place-in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

As shown in FIG. 3A, during collection template generation 304, m collection templates may be generated (e.g., T_0^1 . . . . T_0^m) including a 3D bounding box for each furniture item of a required furniture category 306. Additionally, for each furniture category c in an optional furniture category 308, the machine learning model 186 may predict a 3D bounding box for an optional furniture category c, until a stop token is predicted by the machine learning model 186 or until a maximum number of items has been reached for a particular intended usage type. The machine learning model 186 learns what the most appropriate next category c is based on the currently predicted set of furniture from the training data.

Figure 4:
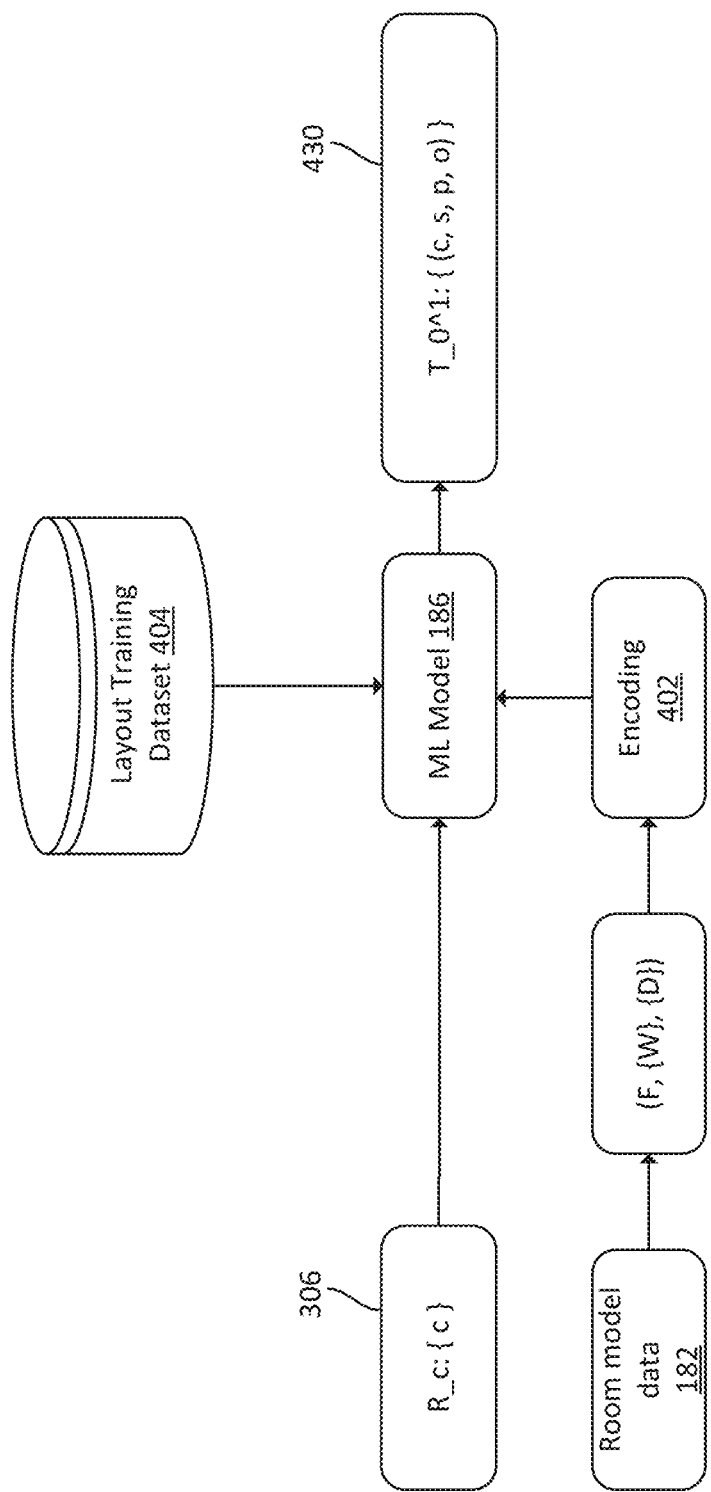
FIG. 4 depicts an example of generating a collection template by a machine learning model, in accordance with various aspects of the present disclosure.

FIG. 4 depicts an example of generating a collection template by a machine learning model, in accordance with various aspects of the present disclosure. As previously described, the machine learning model 186 may be trained using training data (such as layout training dataset 404). During inference, the machine learning model 186 may take room model data 182 (representing the user's scanned room) including (F, {W}, {D}) as shown in FIG. 4 as well as the set of required furniture categories 306 associated with the intended usage data 184. The set of required furniture categories 306 may be determined based on the functional usage mapping 302 described above in reference to FIG. 3A. The room model data 182 may be encoded (block 402) into a data representation suitable for input into the machine learning model 186 (e.g., a column vector, matrix, or similar). The machine learning model 186 may generate output data 430 comprising one or more collection templates including 3D bounding boxes for each required furniture category and any optional furniture categories. The 3D bounding boxes may be predicted based on the statistical models for the next categories, the size s, position p, and orientation o learned during training. In various examples, the machine learning model 186 may predict a bounding box for each required piece of furniture in the set of required furniture categories 306. For optional furniture categories the machine learning model 186 may predict one or more 3D bounding boxes corresponding to optional pieces of furniture (according to the statistical models learned from the training data) until a stop token is predicted. This process may be repeated for any number of collection templates, as desired.

After generating one or more collection templates, the templates may be mapped to populated collections 190 (FIG. 1). The selection of furniture items for populated collections 190 may consider the compatibility of the appearances. For example, a machine learning algorithm may be trained using interior designer generated lifestyle images (images depicting a room populated with visually compatible furniture items). The algorithm may take in a lifestyle image as input along with a usage intent category and may generate a set of furniture items that are stylistically compatible.

Figure 5:
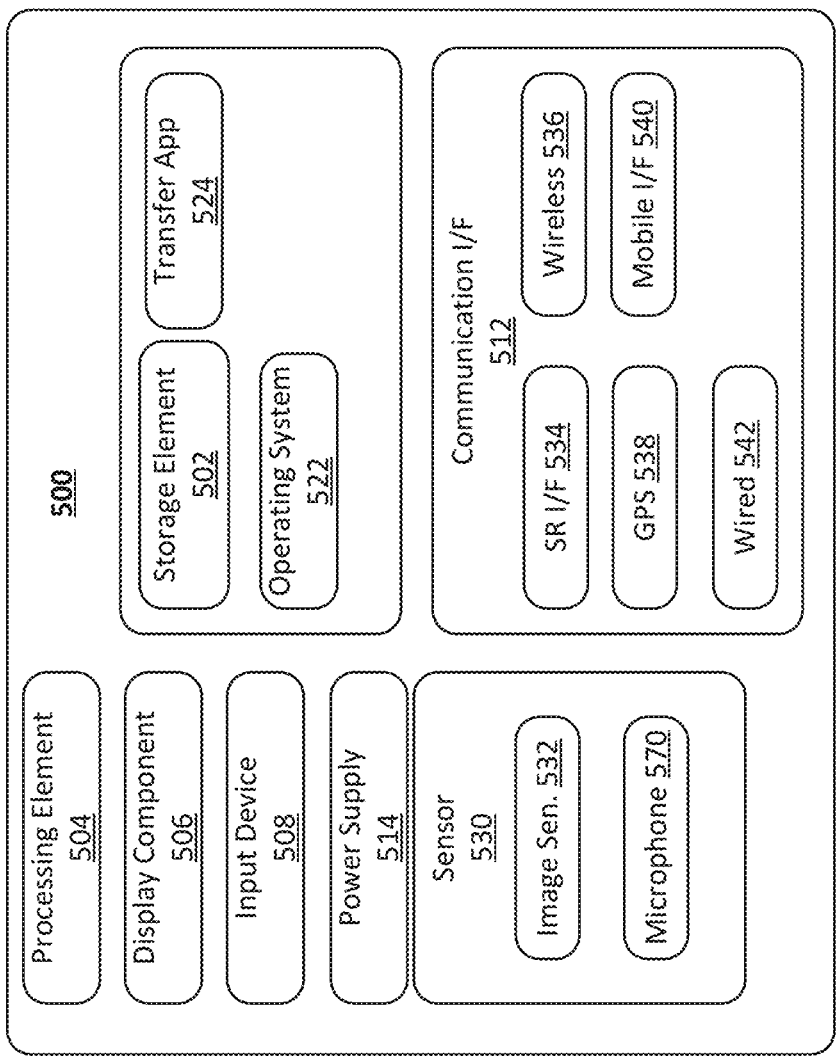
FIG. 5 is a block diagrams showing an example architecture of a computing device that may be used in accordance with various embodiments described herein.

FIG. 5 is a block diagram showing an example architecture 500 of a computing device that may be used for the various techniques described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D room models generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, depth sensors (e.g., a Lidar sensor), and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
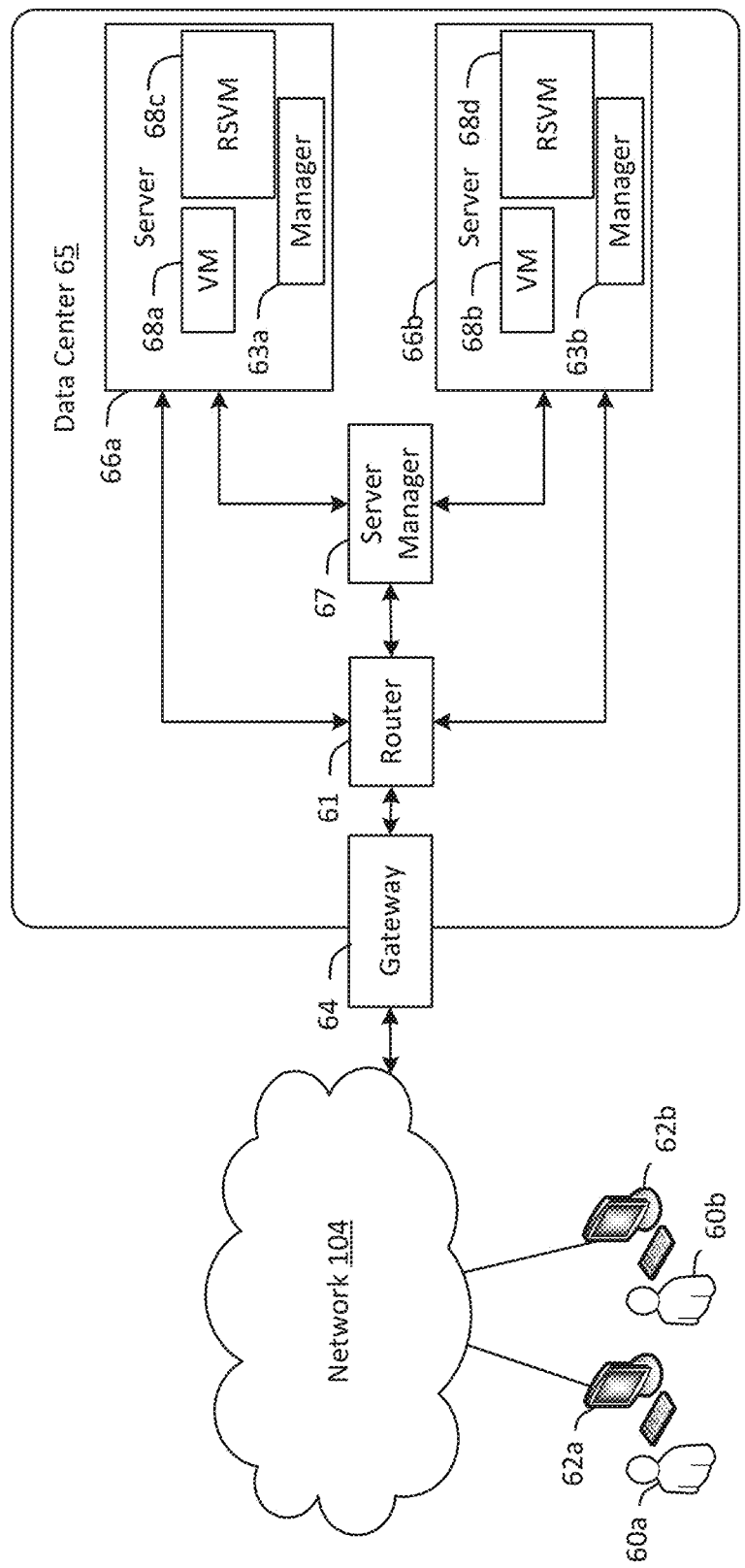
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide furniture layout prediction as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various dynamic occlusion techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
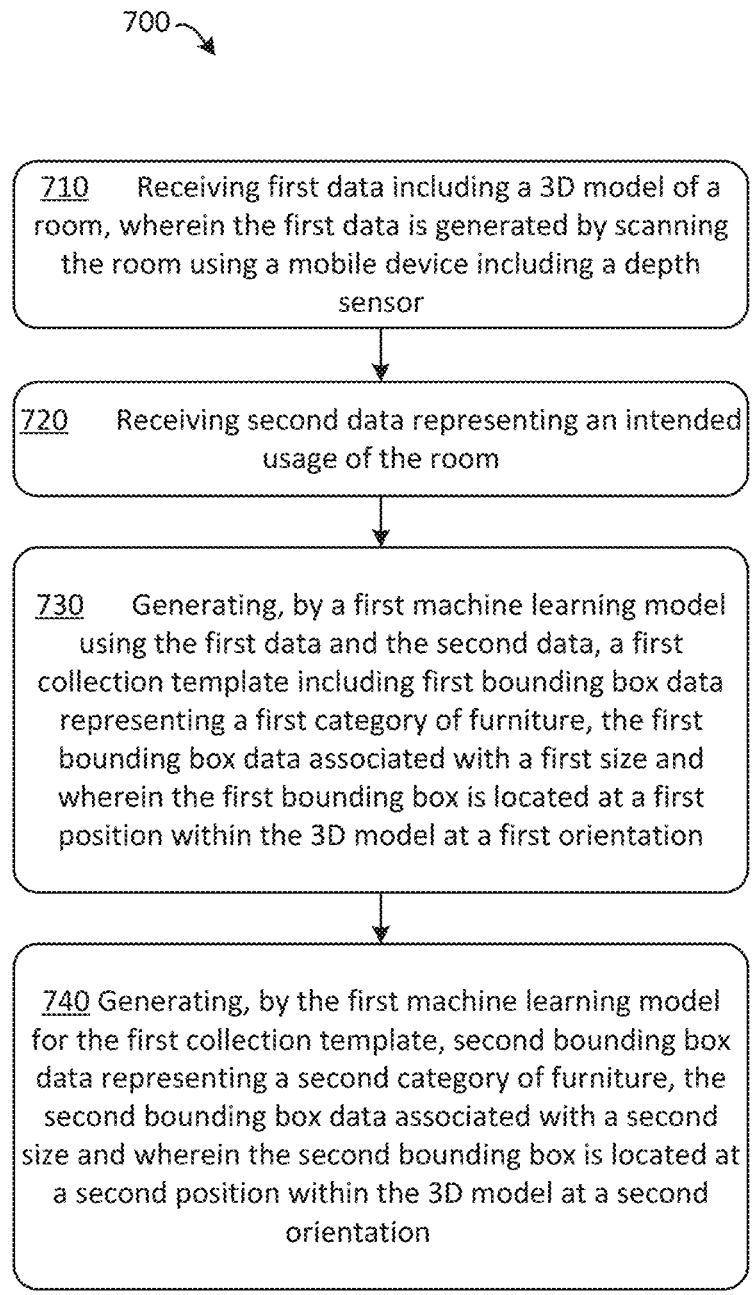
FIG. 7 is a flow chart depicting an example process for generating collection templates for room layouts, in accordance with various aspects of the present disclosure.

FIG. 7 is a flow chart depicting an example process 700 for generating collection templates for room layouts, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which first data including a 3D model of a room may be received. The first data may be generated by scanning a room using a mobile device that includes at least one depth sensor. The 3D model of the room may include plane data that indicates various surfaces detected in the room, color data representing various colors (e.g., pixel information), and/or may distinguish walls, floors, and ceilings from other objects in the room. In various examples, the size, position, and orientation of doors, windows, fireplaces and/or other fixtures may be represented in the 3D room model.

Processing may continue at action 720, at which second data representing an intended usage of the room may be received. In various examples, a user may select an intended usage of the room as part of an application and/or service that is effective to provide augmented reality furniture layout recommendations (as described herein). The user may select from among a set of predefined intended usages (e.g., usage intents) with each usage intent being mapped to a respective set of required furniture categories and/or optional furniture categories as described above.

Processing may continue at action 730, at which a first machine learning model may generate, using the first data and the second data, a first collection template including first bounding box data representing a first category of furniture. The first bounding box data may be associated with a first size(s) and may be located at a first position (p) within the 3D model of the room at a first orientation (o). The first bounding box data may be a 3D bounding box and may not be associated with a specific furniture item, but may instead represent a category of furniture, as well as the size, location, and orientation of such categories of furniture that the first machine learning model has learned from the training data.

Processing may continue at action 740, at which the first machine learning model may generate, for the first collection template, second bounding box data representing a second category of furniture. The second bounding box data may be associated with a second size(s) and may be located at a second position (p) within the 3D model of the room at a second orientation (o). The second bounding box data may be a 3D bounding box and may not be associated with a specific furniture item, but may instead represent a category of furniture, as well as the size, location, and orientation of such categories of furniture that the first machine learning model has learned from the training data. In various examples, the second bounding box data may be positioned with respect to the first bounding box data in a visually and/or functionally complementary position with respect to the first bounding box data according to the statistical models learned by the first machine learning model during training. For example, if the first furniture category represents a couch and the second furniture category represents an end table, the second bounding box may be positioned adjacent to a side of the couch by the first machine learning model since the first machine learning model may have learned from the training data that end tables are typically positioned to one side of couches.

In some examples, and as described in further detail below, the collection templates may be post-processed to separate any overlapping bounding boxes and to ensure that the bounding boxes do not cross any boundaries within the room model (e.g., floors, ceilings, or walls) As described above, the collection templates may be populated to generate populated collections. The populated collections may be ranked according to the conformance of the dimensions of the populating furniture items to the dimensions of the respective bounding boxes and according to the number of items predicted for the room (e.g., the number of bounding boxes) corresponding to a number associated with the intended usage of the room. The ranked populated collections may be rendered (e.g., in 2D as images) and displayed to a user via a user interface of the furniture layout recommendation application or service. The user may select a populated collection of interest from among the ranked list. The selected populated collection may then be rendered in 3D via an augmented reality interface. The furniture items of the selected populated collection may appear overlaid on a live camera view of the user's room and may have the respective size, position, and orientation of the 3D bounding boxes within the user's room. The user may move around the room and the view of the furniture items may change naturally according to the viewpoint of the camera.

Figure 8:
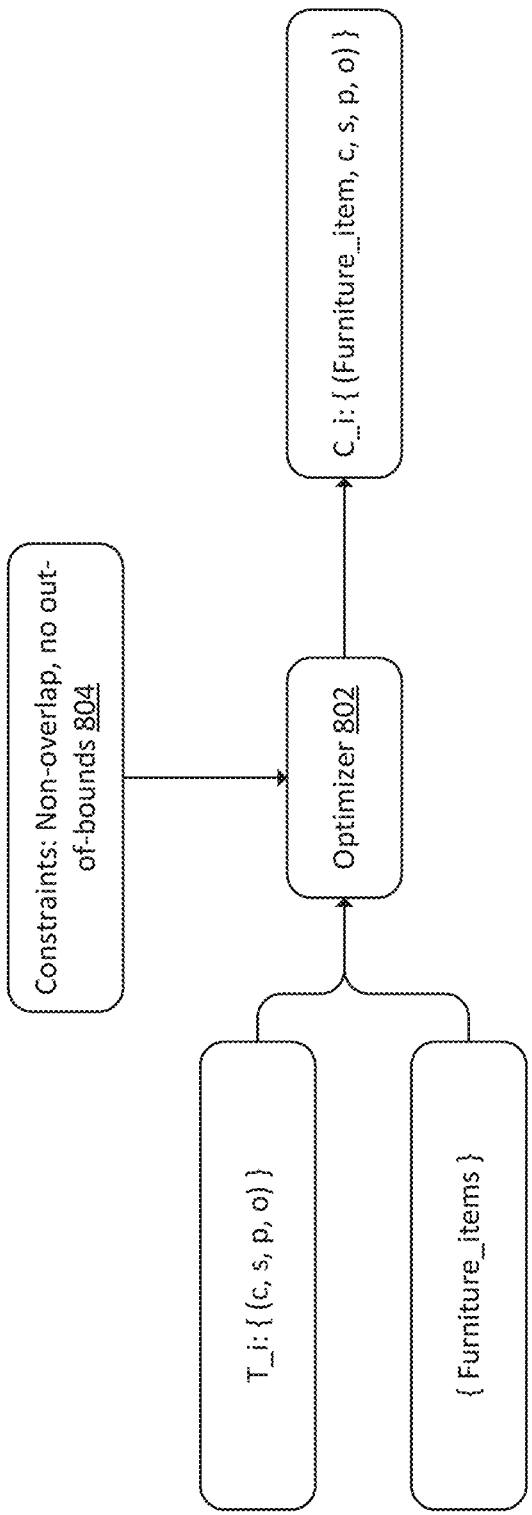
FIG. 8 is a flow chart depicting an example post-processing stage that can be used to modify collection templates, in accordance with various aspects of the present disclosure.

FIG. 8 is a flow chart depicting an example post-processing stage that can be used to modify collection templates, in accordance with various aspects of the present disclosure. The post-processing stage depicted in FIG. 8 takes in one collection template T_i: $\{(c, s, p, o)\}$ and one set of furniture items for that collection template {Furniture_items}. The constraints 804 for the optimizer 802 may be that there is no overlap between bounding boxes of the collection template and that no 3D bounding boxes cross the 3D room boundaries (e.g., the floors, walls, or ceilings). The optimizer 802 may use a gradient-based approach, such as the (limited-memory Broyden-Fletcher-Goldfarb-Shanno algorithm) LBFGS algorithm to update the location of the furniture items (and/or the 3D bounding boxes) in order to minimize the overlap and out-of-bounds errors for a populated template $C\_i=\{(\text{furniture\_item}, c, s, p, o)\}$.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   determining floor plan data representing a top-down floor plan of a room;
   determining a three dimensional (3D) room model comprising:
      first window data representing a first size, a first position, and a first orientation of a first window in the 3D room model; and
      first door data representing a second size, a second position, and a second orientation of a first door in the 3D room model;
   receiving first intended usage data, the first intended usage data describing a usage intent for the room;
   inputting first input data representing the floor plan data, the 3D room model, and the first intended usage data into a first machine learning model;
   generating, by the first machine learning model, a first collection template comprising:
      first bounding box data comprising a first plurality of 3D bounding boxes for the 3D room model, wherein a first 3D bounding box of the first plurality of 3D bounding boxes comprises:
         first furniture category data identifying a first furniture category associated with the first 3D bounding box; and
         first data comprising a third size, a third position, and a third orientation of the first 3D bounding box; and
   generating a first populated collection template by selecting a respective first furniture item for each of the first plurality of 3D bounding boxes; and
   rendering the first populated collection template on a display.

2. The method of claim 1, further comprising:
   receiving a selection of the first populated collection template;
   determining that the first 3D bounding box and a second 3D bounding box of the first plurality of 3D bounding boxes are at least partially overlapping in the first collection template; and
   repositioning at least one of the first 3D bounding box or the second 3D bounding box in the first collection template such that the first 3D bounding box is spaced apart from the second 3D bounding box.

3. The method of claim 1, further comprising:
   generating, by the first machine learning model, a second collection template comprising:
      second bounding box data comprising a second plurality of 3D bounding boxes for the 3D room model, wherein a second 3D bounding box of the second plurality of 3D bounding boxes comprises:
         second furniture category data identifying a second furniture category associated with the second 3D bounding box; and
         second data comprising a fourth size, a fourth position, and a fourth orientation of the second 3D bounding box; and
   generating a second populated collection template by selecting a respective second furniture item for each of the second plurality of 3D bounding boxes;
   determining a first conformance of a first furniture item with respect to the third size of the first 3D bounding box;
   determining a second conformance of a second furniture item with respect to the fourth size of the second 3D bounding box; and
   ranking the first populated collection and the second populated collection based at least in part on the first conformance and the second conformance.

4. The method of claim 1, further comprising rendering a first furniture item on an augmented reality display according to the third size, the third position, and the third orientation of the first 3D bounding box, wherein the first furniture item appears within the room on the augmented reality display.

5. A method comprising:
   receiving first data comprising a three dimensional (3D) model of a room, wherein the first data is generated by scanning the room using a mobile device comprising at least one depth sensor;
   receiving second data representing an intended usage of the room; and
   generating, by a first machine learning model using the first data and the second data, a first collection template comprising:

first bounding box data representing a first category of furniture, the first bounding box data representing a first bounding box having a first size, wherein the first bounding box is located at a first position within the 3D model at a first orientation; and second bounding box data representing a second category of furniture, the second bounding box data representing a second bounding box having a second size, wherein the second bounding box is located at a second position within the 3D model at a second orientation.

6. The method of claim 5, further comprising:
generating a first populated collection template based at least in part by:
  selecting a first furniture item of the first category; and
  selecting a second furniture item of the second category; and
rendering the first populated collection template on a display, wherein the first furniture item is depicted at the first position and at the first orientation and the second furniture item is depicted at the second position and at the second orientation.

7. The method of claim 6, further comprising:
determining that the first bounding box at least partially overlaps the second bounding box; and
modifying the first collection template based at least in part by positioning the first bounding box and the second bounding box in a spaced relationship such that the first bounding box and the second bounding box do not overlap.

8. The method of claim 5, further comprising:
generating, by the first machine learning model using the first data and the second data, a second collection template comprising:
  third bounding box data representing the first category of furniture, the third bounding box data representing a third bounding box having a third size, wherein the third bounding box is located at a third position within the 3D model at a third orientation; and
  fourth bounding box data representing the second category of furniture, the fourth bounding box data representing a fourth bounding box having a fourth size, wherein the fourth bounding box is located at a fourth position within the 3D model at a fourth orientation; and
displaying, at a first user interface, a representation of the first collection template and a representation of the second collection template.

9. The method of claim 8, further comprising:
receiving, at the first user interface, a selection of the first collection template; and
generating an augmented reality display comprising a first furniture item of the first category at the first position and at the first orientation and a second furniture item of the second category at the second position and at the second orientation, wherein the augmented reality display depicts the first furniture item and the second furniture item overlaid on a camera view of the room.

10. The method of claim 5, further comprising:
generating a first populated collection template based at least in part by:
  selecting a first furniture item of the first category for the first bounding box data; and
  selecting a second furniture item of the second category for the second bounding box data;
generating a second populated collection template based at least in part by:
  selecting a third furniture item of the first category for the first bounding box data; and
  selecting a fourth furniture item of the second category for the second bounding box data; and
generating a ranked list comprising the first populated collection template and the second populated collection template.

11. The method of claim 10, further comprising:
determining a first conformance between dimensions of the first furniture item and the first size of the first bounding box;
determining a second conformance between dimensions of the third furniture item and the first size of the first bounding box; and
generating the ranked list based at least in part by comparing the first conformance and the second conformance.

12. The method of claim 5, further comprising:
determining a first number of items associated with the intended usage of the room;
determining a second number of bounding boxes associated with the first collection template; and
generating a ranked list of collection templates, wherein the first collection template is ranked based at least in part on a comparison between the first number of items and the second number of bounding boxes.

13. The method of claim 5, further comprising:
generating a ranked list of collection templates comprising the first collection template based at least in part on conformance of selected furniture item dimensions to bounding boxes of collection templates and a comparison between a number of items associated with the intended usage of the room and a respective number of items predicted by the first machine learning model for each respective collection template of the ranked list of collection templates.

14. A system comprising:
at least one processor; and
non-transitory computer-readable memory storing instructions that, when executed by the at least one processor, are effective to:
  receive first data comprising a three dimensional (3D) model of a room, wherein the first data is generated by scanning the room using a mobile device comprising at least one depth sensor;
  receive second data representing an intended usage of the room; and
  generate, by a first machine learning model using the first data and the second data, a first collection template comprising:
    first bounding box data representing a first category of furniture, the first bounding box data representing a first bounding box having a first size, wherein the first bounding box is located at a first position within the 3D model at a first orientation; and
    second bounding box data representing a second category of furniture, the second bounding box data representing a second bounding box having a second size, wherein the second bounding box is located at a second position within the 3D model at a second orientation.

15. The system of claim 14, the non-transitory computer-readable memory storing further instructions that, when executed by the at least one processor, are further effective to:

generate a first populated collection template based at least in part by:
  select a first furniture item of the first category; and
  select a second furniture item of the second category; and
render the first populated collection template on a display, wherein the first furniture item is depicted at the first position and at the first orientation and the second furniture item is depicted at the second position and at the second orientation.

16. The system of claim 15, the non-transitory computer-readable memory storing further instructions that, when executed by the at least one processor, are further effective to:
determine that the first bounding box at least partially overlaps the second bounding box; and
modify the first collection template based at least in part by positioning the first bounding box and the second bound box in a spaced relationship such that the first bounding box and the second bounding box do not overlap.

17. The system of claim 14, the non-transitory computer-readable memory storing further instructions that, when executed by the at least one processor, are further effective to:
generate, by the first machine learning model using the first data and the second data, a second collection template comprising:
  third bounding box data representing the first category of furniture, the third bounding box data representing a third bounding box having a third size, wherein the third bounding box is located at a third position within the 3D model at a third orientation; and
  fourth bounding box data representing the second category of furniture, the fourth bounding box data representing a fourth bounding box having a fourth size, wherein the fourth bounding box is located at a fourth position within the 3D model at a fourth orientation; and
display, at a first user interface, a representation of the first collection template and a representation of the second collection template.

18. The system of claim 17, the non-transitory computer-readable memory storing further instructions that, when executed by the at least one processor, are further effective to:
receive, at the first user interface, a selection of the first collection template; and
generate an augmented reality display comprising a first furniture item of the first category at the first position and at the first orientation and a second furniture item of the second category at the second position and at the second orientation, wherein the augmented reality display depicts the first furniture item and the second furniture item overlaid on a camera view of the room.

19. The system of claim 14, the non-transitory computer-readable memory storing further instructions that, when executed by the at least one processor, are further effective to:
generate a first populated collection template based at least in part by:
  select a first furniture item of the first category for the first bounding box data; and
  select a second furniture item of the second category for the second bounding box data;
generate a second populated collection template based at least in part by:
  select a third furniture item of the first category for the first bounding box data; and
  select a fourth furniture item of the second category for the second bounding box data; and
generate a ranked list comprising the first populated collection template and the second populated collection template.

20. The system of claim 19, the non-transitory computer-readable memory storing further instructions that, when executed by the at least one processor, are further effective to:
determine a first conformance between dimensions of the first furniture item and the first size of the first bounding box;
determine a second conformance between dimensions of the third furniture item and the first size of the first bounding box; and
generate the ranked list based at least in part by comparing the first conformance and the second conformance.

* * * * *